US012713420B2

(12) United States Patent
Paterour et al.

(10) Patent No.: US 12,713,420 B2
(45) Date of Patent: Aug. 18, 2026

(54) COMMUNICATION NETWORK COMPRISING ONE GEOGRAPHICAL ZONE PER COMMUNICATION GROUP

(71) Applicant: AIRBUS DS SLC, Elancourt (FR)

(72) Inventors: Olivier Paterour, Elancourt (FR); François Piroard, Elancourt (FR)

(73) Assignee: AIRBUS DS SLC, Elancourt (FR)

(*) Notice: Subject to any disclaimer, the term of this patent is extended or adjusted under 35 U.S.C. 154(b) by 289 days.

(21) Appl. No.: 18/299,288

(22) Filed: Apr. 12, 2023

(65) Prior Publication Data

US 2023/0328711 A1 Oct. 12, 2023

(30) Foreign Application Priority Data

Apr. 12, 2022 (FR) ....................................... 2203361

(51) Int. Cl.

| | |
|---|---|
| ***H04W 72/121*** | (2023.01) |
| ***H04L 5/00*** | (2006.01) |
| ***H04W 28/02*** | (2009.01) |
| ***H04W 64/00*** | (2009.01) |

(52) U.S. Cl.

CPC ......... *H04W 72/121* (2013.01); *H04L 5/0048* (2013.01); *H04W 28/0226* (2013.01); *H04W 64/003* (2013.01)

(58) Field of Classification Search

CPC ........... H04W 72/121; H04W 28/0226; H04W 64/003; H04W 4/021; H04W 4/08; H04W 4/50; H04W 4/90; H04W 4/029; H04L 5/0048

See application file for complete search history.

(56) References Cited

U.S. PATENT DOCUMENTS

2018/0160277 A1 6/2018 Patel et al.

OTHER PUBLICATIONS

Open Mobile Alliance, "Group XDM Specification" Version 1.1.1; OMA-TS-XDM_Group-V1_1_1-20170124-A, Jan. 24, 2017 (Year: 2017).*

Search Report as issued in French Patent Application No. FR2203361, dated Oct. 7, 2022.

(Continued)

*Primary Examiner* — Justin T Van Roie

(74) *Attorney, Agent, or Firm* — CUSHMAN PARTNERS, LLC

(57) ABSTRACT

A communication network according to the 3GPP MCS (3rd Generation Partnership Project Mission Critical Services) standard includes at least one first communication group, plurality of user devices each having knowledge of the first communication group, at least one first communication group management server managing the first communication group via a group document specific to the first communication group, the first communication group management server allowing each user device of the plurality of user devices to communicate in the first communication group, the global communication group document including at least one group geographical parameter, the group geographical parameter defining a geographical zone in which the user device of the plurality of user devices is affiliated with the first communication group.

8 Claims, 1 Drawing Sheet

(56) References Cited

OTHER PUBLICATIONS

Generation Partnership Project; Technical Specification Group Services and System Aspects; Functional architecture and information flows to support Mission Critical Data (MCData); Stage 2 (Release 17), 3GPP Standard; Technical Specification; 3GPP TS 23.282, 3rd Generation Partnership Project (3GPP), vol. SA WG6, No. V17.8.0, Sep. 2021, Retrieved from the Internet: URL:https://ftp.3gpp.org/Specs/archive/23_series/23.282/23282-h50.zip 23282-h50.doc [Retrieved on Dec. 19, 2020], XP051975162, pp. 1-275.

* cited by examiner

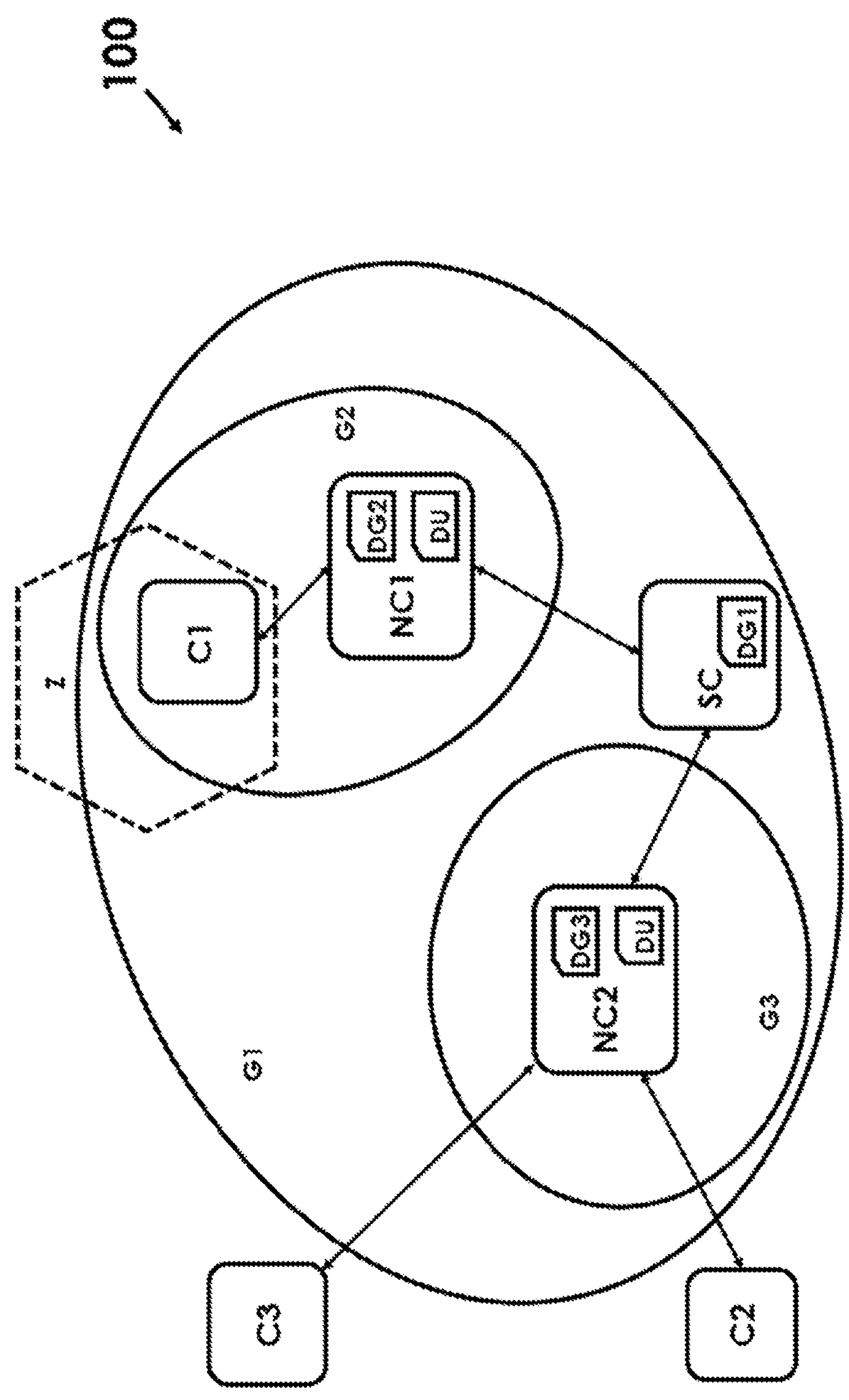
100
G1
G2
G3
C1
NC1
DG2
DU
SC
DG1
NC2
DG3
DU
C2
C3

COMMUNICATION NETWORK COMPRISING ONE GEOGRAPHICAL ZONE PER COMMUNICATION GROUP

CROSS-REFERENCE TO RELATED APPLICATIONS

This application claims priority to French Patent Application No. 2203361, filed Apr. 12, 2022, the entire content of which is incorporated herein by reference in its entirety.

FIELD

The technical field of the invention is that of communication networks and more particularly that of communication networks according to the 3GPP MCS standard.

The present invention relates to a communication network and more particularly to a communication network comprising a geographical parameter managed by servers at the communication groups.

BACKGROUND

The PMR (Professional Mobile Radio) radiocommunication standards TETRAPOL®, TETRA® or P25® implement servers that allow availability of one or several services to be announced to pieces of user equipment when they are located in some zone, or when they enter some zone. These located announcements are made via the radio coverage of the network base stations: when it is desired to announce that a service is available to a user located at some location, it is sufficient to send a signalling message to a base station covering this location, which broadcasts it to the pieces of user equipment in the radio zone it covers. These communications use a control radio channel for radio signalling.

A piece of user equipment receiving a signalling message has on-board intelligence and can then decide whether it is able to use the service announced and/or whether it is authorised to do so by parameters attached to the signalling message. It is thus possible, for example, to limit access to the communications of a group to a geographical zone. The user will have to be attached to (TETRA®) or affiliated with (P25®) the group considered beforehand, regardless of its geographical position. The user is then not notified of the implementation of the group, but of its activation, for example by receiving media on this group.

These networks are evolving towards support for broadband exchanges. The 3GPP standard governing mobile networks of the "GSM" (Global System for Mobile Communications) type, and more particularly in deployments resorting to critical communications services defined by the 3GPP, called "MCS" (Mission Critical Services), allows for these secure broadband exchanges.

By "communication network according to the 3GPP MCS standard", it is meant a communication network compatible with the 3GPP MCS standard and more particularly with the current version of the 3GPP which is version 17, with the previous versions from version 13 onwards and with the following versions incorporating all the characteristics of the invention.

In the 3GPP MCS standard, the following communication services are defined:

- MCPTT (Mission Critical Push To Talk), which allows for voice communications,
- MCVideo, which allows for video communications,
- MCData, which includes three sub-services:
  - SDS (Short Data Service) and
  - FD (File Distribution),
  - IPCon (IP Connectivity).

Hereafter, "MCX entity" will refer to a network entity implementing any 3GPP MCS communication service, that is MCPTT, MCData or MCVideo.

In the 3GPP MCS standard, announcements depending on a geographical parameter are possible. This geographical parameter is defined for a user of a network client entity and is included in a document related to the user, stored by a network user database and retrieved by each network server managing communications related to that user. In the case of an affiliation with a group based on the position of the user device, it is the user device that makes the decision to be affiliated by knowing its position.

For the purpose of authorising a user to affiliate with a group only within a given geographical zone, for example following a distress call, there may be a process in the administration tools that determines the members of a group and modifies the user profile parameters of each member of the group, member by member. Such a process is cumbersome and time consuming to set up and use. Moreover, such a process only works in cases where the administration tool has knowledge of all the members of the group. Indeed, a group is managed by an MCX server, and a modification in the geographical parameter is imposed by the network administration tool on the MCX server which manages the group, the modification in the geographical parameter being defined by the administration tool for each user in the group whose geographical parameter is to be modified at the user profile known to the MCX server. The administration tool shall then send to the MCX server managing the group a list of each member which is to have their geographical parameter in their user profile modified by the MCX server.

An MCX server manages a communication group by implementing management functions for this group defined by the 3GPP MCS standard, and comprises at least one user profile of each user member of the group and at least one group document. Such an MCX server is called a Group Management Server (GMS). A group document is defined by the Open Mobile Alliance OMA-TS-XDM_Group "Group XDM Specification" version 1.1.1 of 24 Jan. 2017. A user profile is managed in the Configuration Management Server (CMS). A user profile is managed through several different documents as described in the 3GPP MCS TS 24.484 technical specification.

The 3GPP MCS standard defines group regroups, that is the possibility to regroup several communication groups into one "regrouped" or "global" group, temporarily. For this, an MCX server is defined as managing this group regroup among the different MCX servers already managing each group constituting the regroup. It is referred to as "Controlling". The other MCX servers managing a group constituting the regroup but not managing the group regroup is referred to as "Non-controlling".

To authorise affiliation of a user with a group regroup in a given geographical zone, the use of the previous solution is not possible because the geographical zone is defined per user and there is no mechanism to propagate update of the geographical parameter of each user of the regroup from the controlling server to the other non-controlling servers. The administration tool has neither the knowledge of all the members of the regroup nor the server to which they are attached. It is therefore not possible to modify the geographical zone as a parameter of the group regroup.

Furthermore, updating the geographical parameter existing in the user profile requires updating the profile on all clients, which takes some time, especially if the density of clients is high on some cells. Indeed, an update to the document managed by the management server will be propagated to each client since each client has previously subscribed, via a so-called "subscribe" message, in order to receive any subsequent modification made to the document, via a "notify" message. This also creates risks of desynchronisation between the server and clients and between clients.

There is therefore a need, in a network according to the 3GPP MCS standard, to be able to authorise affiliation of an MCX client entity with a group and its constituent groups, known to all MCX client entities, but whose affiliation is authorised only within a defined geographical perimeter of this group and only if the MCX client entity is situated within this geographical perimeter, in a simple, reliable and rapid manner.

SUMMARY

An aspect of the invention offers a solution to the previously discussed problems by providing a geographical parameter at the group document in a network according to the 3GPP MCS standard, statically or dynamically updated.

One aspect of the invention relates to a communication network according to the 3GPP MCS standard comprising:

- At least one first communication group,
- A plurality of user devices each having knowledge of the first communication group,
- At least one first communication group management server managing the first communication group via a group document specific to the first communication group, the first communication group management server allowing each user device of the plurality of user devices to communicate in the first communication group, the global communication group document comprising at least one group geographical parameter, the group geographical parameter defining a geographical zone in which the user device of the plurality of user devices is affiliated with the first communication group.

By virtue of an aspect of the invention, it is possible to manage affiliation of user devices with groups based on a geographical parameter at the groups. Thus, in one exemplary implementation of the invention described herein, it is the communication group management servers that make decisions regarding affiliation of user devices with groups and not the user devices themselves, unlike prior art. It is also simpler in the invention to propagate a single geographical parameter because it is assigned to the group and not to a user. A group management server can thus, by knowing which groups are regrouped into a global group, propagate this parameter to the other servers managing these regrouped groups. Each server then has the additional function of monitoring whether or not this criterion is met for the users it manages and for the group it manages. This paradigm change in the management of affiliations based on geographical parameters solves the problems of the state of the art in a simple way.

An aspect of the invention can then make it possible to define a geographical zone around an incident involving the coordination of emergency and security forces and to automatically affiliate user devices in this zone even if they belong to different groups, by initiating a group regrouping, propagating the geographical parameter to the servers managing the groups regrouped, and affiliating the users present in the zone defined by the geographical parameter.

An aspect of the invention has the benefit that the geographical parameter is unique for a communication group, and therefore does not require distinguishing between user devices. Furthermore, user devices do not need to have knowledge of this geographical perimeter to perform conventional functionalities related to location, unlike the state of the art, improving at the same time the security of the network.

In addition to the characteristics just discussed in the preceding paragraph, the communication network according to one aspect of the invention may have one or several complementary characteristics among the following, considered individually or according to all technically possible combinations:

- the first communication group is a global communication group regrouping at least one second communication group and at least one third communication group.
- the communication network has at least one second management server and one third management server, the second management server managing the second communication group, the third management server managing the third communication group, the first management server being configured to propagate the geographical parameter of the group document to the second management server and the third management server when the geographical parameter is modified, when the geographical parameter is set up and/or when the first communication group is created by regrouping the second communication group and the third communication group.
- the management server of the first communication group is further configured to:
  - determine that at least one first user device of the plurality of user devices has entered the geographical zone defined by the geographical parameter,
  - initiate the affiliation of the first user device with the first communication group.
- the first communication group management server is further configured to receive, from each user device of the plurality of user devices, the position of the user device periodically and wherein the first communication group management server uses the position of the user device received to determine whether the user device has entered the geographical zone defined by the geographical parameter.
- each user device of the plurality of user devices comprises a positioning module and is configured to periodically:
  - determine its position using its positioning module,
  - transmit its position to the management server of the first communication group.
- the geographical parameter of the group document of the first communication group is defined by configuring the communication network.
- the geographical parameter of the group document of the first communication group is dynamically updated following issuing an alert by at least one user device to the management server of the first communication group, the geographical zone defined by the geographical parameter then being centred at the user device having issued the alert, the alert issued comprising the position of the user device.
- the geographical zone defined by the geographical parameter is polygonal or ellipsoidal.

The invention and its different applications will be better understood upon reading the following description and upon examining the accompanying FIGURES.

BRIEF DESCRIPTION OF THE FIGURES

The figures are set forth by way of indicating and in no way limiting purposes of the invention.

FIG. 1 shows a schematic representation of a communication network according to the invention.

DETAILED DESCRIPTION

Unless otherwise specified, a same element appearing in different FIGURES has a single reference.

FIG. 1 shows a schematic representation of a communication network according to an aspect of the invention. The communication network according to the invention is a network according to the 3GPP MCS standard.

By "communication network", it is meant a network allowing access to communication services, that is services related to communication, such as access to audio, video or file-based messaging to interact with one or several user devices. The communication services enable communications between user devices or group communications between user devices affiliated with the same communication group.

By "communication group", it is meant a virtual group regrouping several user devices that can interact with each other once authenticated to a group management server of the communication network that allows access to the communication group.

The communication network 100 represented in FIG. 1 comprises a plurality of communication groups. An aspect of the invention also covers the particular case in which the communication network 100 comprises only one communication group.

The communication network 100 comprises a first communication group G1. This first communication group G1 is a "global" group regrouping two pre-existing communication groups. The global group G1 regroups a second communication group G2 and a third communication group G3.

The communication network 100 may be fixed, for example a communication network covering an enterprise, or mobile, for example tactical, that is used in the case of a special forces mission.

A user device C1, C2 and C3, also referred to as a user equipment (UE) or client entity, is for example a smartphone, tablet, laptop or any other device that allows communication within a network. A user device comprises at least one memory and at least one processor, the memory comprising instructions which, when executed by the processor, cause the user equipment to implement the actions assigned to it in the following description. In an embodiment, the user devices comprise a display module. Likewise, the different servers, including controlling and non-controlling servers and communication group management servers, are devices comprising at least one memory and at least one processor, the memory comprising instructions which, when executed by the processor, cause the server to implement the actions assigned to it in the following description. The servers and user devices are interconnected and form the network 100 as represented in FIG. 1, the network implementing wired, wireless communications, or any combination thereof.

The network 100 according to an embodiment of the invention comprises at least one communication group management server. Such a communication group management server is also called "GMS" (Group Management Server) in the 3GPP MCS standard. Each communication group management server comprises a group document DG and a user document DU for each user device it manages. The group document DG is as defined in the state of the art, and the user document DU is a user profile as defined in the state of the art. Other types of servers, defined by the 3GPP MCS standard and necessary for its implementation, are not represented for clarity.

In the invention, unlike the state of the art, the geographical parameter is not implemented at user devices, that is within the user documents DU, but at communication groups, that is within the group documents DG.

The geographical parameter comprises geographical zone shape information Z, geographical zone centre information Z and geographical zone extent information Z. The geographical zone Z is, in an embodiment, polygonal or ellipsoidal in shape, but may be of any other shape. Centre information of the geographical zone Z is, for example, of the GPS (Global Positioning System) coordinates type. Extent information of the geographical zone Z is for example a distance or an area expressed by a value. The geographical parameter can be added to a group document as an element, as defined in the 3GPP MCS standard. Such a geographical parameter element may for example take the following form:

| |
|---|
| A <GeoPerimeter> element comprising: |
| - At least one <LocationCriteria> element comprising: |
| - a <PolygonArea> element or an <EllipsoidArcArea> element. |

A geographical parameter is associated with at least one communication group, defining a geographical zone Z in which a user device of the plurality of user devices of the network 100 may perform an action related to the communication group associated with the geographical parameter. In the remainder of the description, the focus will be on describing the affiliation of user devices with a communication group when in the geographical zone Z, but an aspect of the invention covers any action of the user device entering or located in the geographical zone Z related to the communication group associated with the geographical parameter defining the geographical zone Z.

By adding the geographical parameter at the communication groups, the management server in charge of a group regroup is able to propagate the geographical parameter to the other management servers of the communication groups regrouped, for implementation in their own group documents DG. For example, as represented in FIG. 1, the controlling server SC manages the global group G1 and includes a group document DG1. A non-controlling server NC1 manages the second communication group G2 and comprises a group document DG2 of the communication group G2 and a non-controlling server NC2 manages the third communication group G3 and comprises a group document DG3 of the communication group G3. In one embodiment, the controlling server SC is one and the same as one of the non-controlling servers NC1 or NC2.

The geographical parameter may be implemented a first time within the group documents, and then may be updated. The first implementation of the geographical parameter may be manual, that is by configuring the server comprising that group document, or it may be automatic, for example by transmitting the geographical parameter from a network administration tool 100 or another server to the server comprising the group document, or for example by generating, by the server or another server, the geographical parameter, for example by using a geographical parameter generation process whose steps are stored in memory. When implementing the geographical parameter for the first time in one of the communication group management servers SC, NC1 or NC2, or when updating the geographical parameter, the server implementing the geographical parameter for the first time or updating it is configured to propagate the geographical parameter to other servers if the communication group associated therewith is a group regroup, constituted by several regrouped communication groups. This is the case for the global group G1.

A first implementation or update of the geographical parameter in the group document by a management server may be initiated by a distress call. In the case of a distress call, the distress call announcement issued by a user device may include the location of the user equipment originating the distress call. This enables locating the user equipment originating the distress call and thus locating the event. The centre of the geographical zone Z is hence defined by the position of the user device issuing the distress call, and the size and shape of the zone may be defined for example by configuration, for example included in the management server or in a database of the network 100 accessible by the management server. An "update" of the geographical parameter is defined as a modification in either the size of the geographical zone Z, the centre of the geographical zone Z or the shape of the geographical zone Z. This change may originate from an operator of the network 100, a server of the network 100, or a user device of the network 100. An update may also include creation of a geographical parameter in the group document.

The controlling server SC, upon receiving the geographical parameter or upon updating the geographical parameter associated with the group G1, is then configured to propagate the geographical parameter to the other servers managing the communications groups regrouped in the global group GA. It is thereby configured to transmit the geographical parameter to the management server NC1 of the second communication group G2 and to the management server NC2 of the third communication group G3. Upon receiving this new or updated geographical parameter, the management servers respectively add the geographical parameter to the group document DG or update the geographical parameter included in the group document DG. Propagation can also take place upon regrouping the groups G2 and G3 into the global group G1, allowing the geographical parameter of the created global group G1 to be transmitted to the existing communication groups G2 and G3. This may occur when a geographical zone Z is associated with the group regroup. The geographical parameter is then transmitted with the regroup command, sent by the management server SC of the communication group G1 to the management servers NC1 and NC2 of the communication groups G2 and G3. Furthermore, the invention is compatible with the two regroup modes provided by the 3GPP MCS standard:

- If the regroup method used is "regroup based on preconfigured group", that is regroup based on a preconfigured communication group, then the modification can be performed:
  - either at the group document of the pre-configured group in the management server of the pre-configured group,
  - or in the parameters of the regroup itself, that is in the dynamic data of the controlling server of the preconfigured group, and transmitted to the controlling servers of the groups constituting the regroup so that they can determine which of their members are actually within the perimeter defined by the geographical zone Z, by a SIP MESSAGE of creating or updating the regroup, to which the geographical perimeter of the regroup which does not exist in prior art will have been added.
- If the method used is the creation of a new group in the management server of the regroup, the new group comprising constituent groups, then it is also necessary to add the geographical parameter to the regroup notification message, from the regroup management server to the constituent group management servers and from the management servers to the MCX servers. This second method allows the pre-configured regroup to continue to be used as the basis for other regroups that do not use a perimeter or use a different perimeter.

In both cases, the geographical parameter is added in the group document and/or in the regroup command sent to the management servers of the groups constituting the regroup group.

The user devices C2 and C3 are not affiliated with any communication group represented in FIG. 1, as they are not in the geographical zone Z defined by the geographical parameter of the group document DG1 of the group G1, and thus defined by propagation by the geographical parameter of the group document DG2 of the group G2 and the group document DG3 of the group G3.

A user device C1 of the communication network 100 is affiliated with the second communication group G2. Indeed, this is in the geographical zone Z defined by the geographical parameter of the group document DG2 of the second communication group G2. The user device C1 of the network 100 is thus also affiliated with the global group G because the group G2 is regrouped with the group G3 in the global group G1.

The user device C1 is affiliated with the second communication group G2 because it has entered the geographical zone Z defined by the geographical parameter of the group document DG2 of the second communication group G2, or because it was in this zone upon implementing the geographical parameter. The management server NC2 of the communication group G2, monitoring entries and exits of this zone by the user devices it manages, then alerted the user device C1 to the fact that it had to affiliate or could affiliate with the communication group G2. The need to affiliate or the possibility to affiliate is defined by configuration in association with the geographical parameter in the group document DG2.

Monitoring entry or exit of user devices by the management servers in the geographical zone Z is not part of the present invention. The management server may know the position of the user device, for example if the user device is configured to periodically report its position to the location management server managing it. The position may be retrieved by the user device and added to a periodic message to the management server using a positioning and/or positioning assistance module it comprises, for example a GPS module or a wireless module such as a Wi-Fi® module.

The alert, by the management server NC1 of the communication group G2 to the user device C1, is for example of the SIP MESSAGE type. SIP is a Session Initiation Protocol.

All user devices have the knowledge of the communication group(s) with which they are likely to be affiliated when entering the geographical zone Z. In order to have the knowledge of the communication group(s), this (these) communication group(s) is (are) configured in advance for all users which may be eligible for the communication services they offer. The user obtains prior to use of the invention a list in their user profile of all the groups of which the user is a member, and then loads the corresponding group documents.

The affiliation of the user device C1 with the communication group G2 may be an implicit affiliation as allowed by the 3GPP MCS standard, that is by being restrictively affiliated by the system governing the network 100. The affiliation may also be achieved at the discretion of a user of the user device C1, for example by displaying on a screen of the user device C1.

The user device may also decide whether or not to affiliate with the communication group indicated in the information received, when the affiliation is not restricted to it and it is not configured to query its user via a screen, by implementing, for example by a processor of the user device, a method stored in memory of the user device.

The geographical parameter allows for the creation of a service zone. For example, when a user device enters this zone, its user may be notified of a service available in this zone, for example a group communication.

An aspect of the invention also covers contrary actions, that is de-affiliation of a user device C1 leaving the geographical zone Z. De-affiliation is performed in the same way as affiliation, except that the user device does not have a choice whether to de-affiliate or not. The de-affiliation is imposed by the server monitoring entries and exits of the geographical zone Z and hence has to be implemented by the user device leaving the geographical zone Z.

A management server or all management servers in the network may be configured so that, if the geographical parameter is not populated in a group document of a communication group, or if the group document indicates a "null" geographical zone Z, the communication group is not authorised anywhere, thus no user device can affiliate with it until the geographical parameter has been updated. In one alternative, a management server or all management servers in the network may be configured so that, if the geographical parameter is not populated in a group document of a communication group, or if the group document indicates a "null" geographical zone Z, the communication group is authorised anywhere, so any user equipment may affiliate with it at any time.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments described previously are combinable according to any technically permissible combinations.

The invention claimed is:

1. A communication network according to the 3GPP MCS (3$^{rd}$ Generation Partnership Project Mission Critical Services) standard comprising:

at least one first communication group, a plurality of user devices each having knowledge of the first communication group, a first communication group management server managing the first communication group via a group document defined by the Open Mobile Alliance OMA-TS-XDM_Group "Group XDM Specification" version 1.1.1 of 24 Jan. 2017, the group document being specific to the first communication group, the first communication group management server allowing each user device of the plurality of user devices to communicate in the first communication group, the group document comprising at least one group geographical parameter, the group geographical parameter defining a geographical zone in which the user device of the plurality of user devices is affiliated with the first communication group, wherein the first communication group management server is configured to both manage the first communication group via the group document and use a received position of a user device to determine whether the user device has entered the geographical zone defined by the group geographical parameter, wherein the first communication group is a global communication group regrouping at least one second communication group and at least one third communication group, and wherein the communication network further comprises at least one second management server and one third management server, the second management server managing the second communication group, the third management server managing the third communication group, the first communication group management server being configured to propagate the group geographical parameter of the group document to the second management server and the third management server when the group geographical parameter is modified, when the group geographical parameter is set up or when the first communication group is created by regrouping the second communication group and the third communication group.

2. The communication network according to claim 1, wherein the first communication group management server of the first communication group is further configured to:

determine that at least one first user device of the plurality of user devices has entered the geographical zone defined by the group geographical parameter, and initiate affiliation of the first user device with the first communication group.

3. The communication network according to claim 1, wherein the first communication group management server is further configured to receive, from each user device of the plurality of user devices, the position of the user device periodically and wherein the first communication group management server uses the position of the user device received to determine whether the user device has entered the geographical zone defined by the group geographical parameter.

4. The communication network according to claim 3, wherein each user device of the plurality of user devices comprises a positioning module and is configured to, periodically:

determine its position using its positioning module, and transmit its position to the management server of the first communication group.

5. The communication network according to claim 1, wherein the group geographical parameter of the group document of the first communication group is defined by configuring the communication network.

6. The communication network according to claim 1, wherein the group geographical parameter of the group document of the first communication group is dynamically updated following issuing an alert by at least one user device to the first communication group management server, the geographical zone defined by the group geographical parameter hence being centred at the user device having issued the alert, the alert issued comprising the position of the user device.

7. The communication network according to claim 1, wherein the geographical zone defined by the group geographical parameter is polygonal or ellipsoidal.

8. A communication network according to the 3GPP MCS ($3^{rd}$ Generation Partnership Project Mission Critical Services) standard comprising:

at least one first communication group;

a plurality of user devices each having knowledge of the first communication group; and a first communication group management server managing the first communication group via a group document defined by the Open Mobile Alliance OMA-TS-XDM_Group "Group XDM Specification" version 1.1.1 of 24 Jan. 2017, the group document being specific to the first communication group, the first communication group management server allowing each user device of the plurality of user devices to communicate in the first communication group, wherein the first communication group is a global communication group regrouping a second communication group managed by a second management server and a third communication group managed by a third management server, the group document comprising at least one group geographical parameter, the group geographical parameter defining a geographical zone, and wherein the first communication group management server, acting as a controlling server, is configured to propagate the group geographical parameter to the second management server and the third management server acting as non-controlling servers, the second management server managing the second communication group via a second group document defined by the Open Mobile Alliance OMA-TS-XDM-_Group "Group XDM Specification" version 1.1.1 of 24 Jan. 2017, the second group document being specific to the second communication group and being configured to store the group geographical parameter after the propagation, the third management server managing the third communication group via a third group document defined by the Open Mobile Alliance OMA-TS-XDM_Group "Group XDM Specification" version 1.1.1 of 24 Jan. 2017, the third group document being specific to the third communication group and being configured to store the group geographical parameter after the propagation.

* * * * *